United States Patent [19]

Yaoita

[11] Patent Number: 4,641,991
[45] Date of Patent: Feb. 10, 1987

[54] CONNECTOR FOR REINFORCING RODS

[76] Inventor: Yūhei Yaoita, No. 75, Oaza Hataya, Nishikawa-machi, Nishi-Kanbara-gun, Niigata-ken, Japan

[21] Appl. No.: 750,702

[22] Filed: Jun. 28, 1985

[30] Foreign Application Priority Data

Jun. 29, 1984 [JP] Japan ............... 59-98777[U]

[51] Int. Cl.$^4$ ............... B25G 3/36; E04G 7/00
[52] U.S. Cl. ............... 403/397; 52/719
[58] Field of Search ............... 403/397; 52/719, 685, 52/686

[56] References Cited

U.S. PATENT DOCUMENTS

| | | | |
|---|---|---|---|
| 517,484 | 4/1894 | Ryckman et al. | 256/57 X |
| 562,947 | 6/1896 | Bennett et al. | 403/397 |
| 1,185,263 | 5/1916 | Symous | 52/719 |
| 1,500,832 | 7/1924 | Ludwik | 52/719 |
| 1,543,207 | 6/1925 | Erb et al. | 52/719 |
| 1,684,051 | 9/1928 | Anderson | 52/719 |

FOREIGN PATENT DOCUMENTS

| | | | |
|---|---|---|---|
| 2322814 | 11/1974 | Fed. Rep. of Germany | 403/397 |
| 723879 | 1/1932 | France | 52/686 |

Primary Examiner—Andrew V. Kundrat
Attorney, Agent, or Firm—Flynn, Thiel, Boutell & Tanis

[57] ABSTRACT

A connector for connecting a vertical rod and a horizontal rod crossing with the vertical rod at right angles, which connector is entirely made of a spring quality wire material and comprises: laterally directed U-shaped upper and lower portions; and a middle portion for connecting the upper and lower portions, which upper portion is bent downward in front ends of both feet thereof, which middle portion extends from a front end of a foot of the feet of the upper portion downward and obliquely, a lower end of which middle portion is connected to one of a pair of feet of the lower portion, which one is disposed in a position corresponding to that opposite to a position in which the above-mentioned foot of the pair of feet of the upper portion is disposed.

3 Claims, 10 Drawing Figures

FIG. 4
FIG. 5
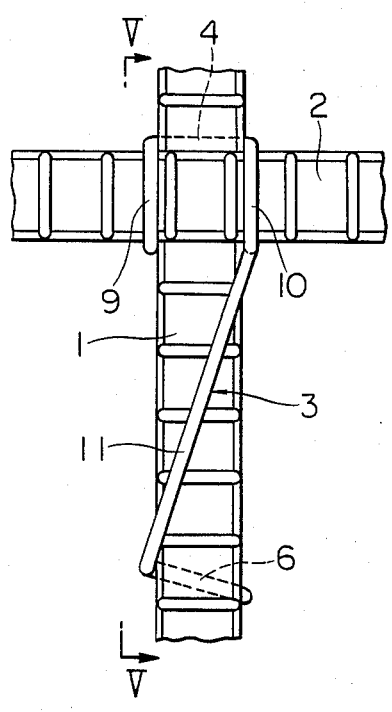
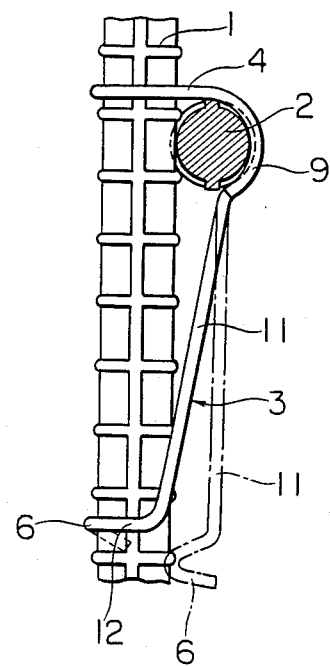
FIG. 6
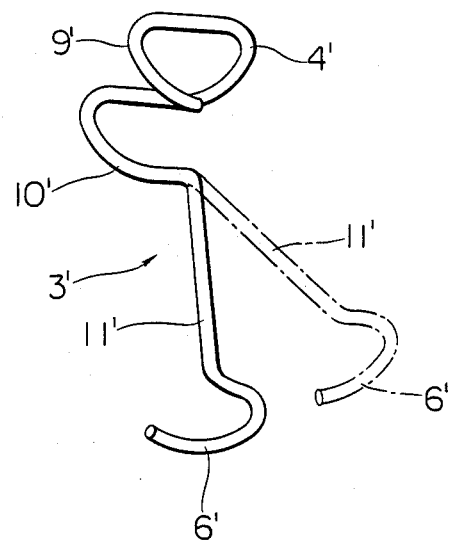

4,641,991

CONNECTOR FOR REINFORCING RODS

BACKGROUND OF THE INVENTION

1. Field of the Invention

The present invention relates to a connector for reinforcement, i.e., reinforcing rods crossing with each other at right angles in building use.

2. Description of the Prior Art

Hitherto, in a building site, the reinforcing rods crossing with each other at right angles, i.e., a vertical rod and a horizontal rod are connected with each other at their crossing portion through a wire wound round the crossing portion by means of a specialized wiring tool. However, in such wiring operation, a worker is required to be skilled in a operation of the specialized wiring tool, and it is hard to promote an efficiency of such wiring operation even if the worker is skilled in the operation thereof. Furthermore, there is a fear that such wiring operation, i.e., wiring connection lacks a safety in strength because of a wide variation of its strength. In addition to the above defect, there is another defect in that, for example, in constructing of a slab in which the reinforcing rods are stacked into a plurality of layers in which an electric and water service pipelines are disposed, in which construction it is often required to undo the wiring connection, it is very hard to satisfy such reqirement. These defect are inherent in the conventional wiring connection for the reinforcing rods.

SUMMARY OF THE INVENTION

Consequently, it is an object of the present invention to provide a connector for the reinforcing rods, which connector eliminates the defects inherent in the conventional wiring connection, requires no specialized wiring tool and no skilled worker in its connecting/disconnecting operation with respect to the vertical and horizontal rods in contrast with the conventional wiring connection, and has a good operational efficiency and a steady strength.

The above object of the present invention is accomplished by providing a connector for the reinforcing rods, which connector is made of a spring quality wire material and comprises: upper and lower portions each of which portions has a substantially laterally directed U-shaped configuration; and a middle portion for connecting the upper and lower portions, which upper portion has a pair of feet which are bent in their front ends to form a pair of bends directed downward, which middle portion extends from a front end of one of the feet of the upper portion downward and obliquely, and a lower end of which middle portion is intergrally connected to one of a pair of feet of the lower portion which one foot is disposed in a position corresponding to a position where the other foot of the feet of the upper portion is disposed. Namely, as for the reinforcing rods, the vertical rod is inserted into the longitudinal openings formed in both the U-shaped upper and lower portions to penetrate them, and the horizontal rod is inserted into the bends directed downward, which bends are formed in the front ends of the pair of feet of the upper portion, so that the vertical rod and the horizontal rod are connected with each other through the above connecting operation while disconnected from each other through a disconnecting operation which procedure is reverse to that of the connecting operation, whereby an efficiency of the connecting/disconnecting operation is enhanced and a connection having a steady strength is obtained with respect to the reinforcing rod connecting operation.

BRIEF DESCRIPTION OF THE INVENTION

FIG. 4 is a front view of the first embodiment of the present invention in a condition in which the vertical rod and the horizontal rod are connected with each other through the first embodiment of the present invention;

FIG. 5 is a sectional view taken along the line V—V shown by the arrow in FIG. 4;

FIG. 6 is a perspective view of the second embodiment of the connector for the reinforcing rods according to the present invention;

DESCRIPTION OF THE PREFERRED EMBODIMENTS

Figure 1:
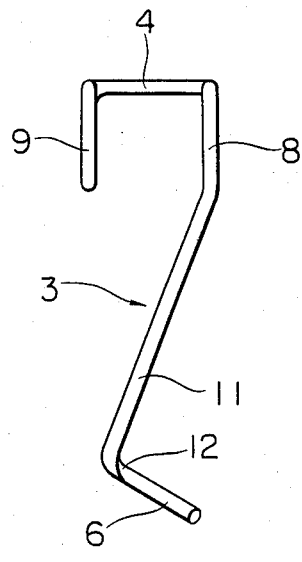
FIG. 1 is a front view of the first embodiment of the connector for the reinforcing rods, according to the present invention.

In the drawings, the reference numerals 1 and 2 designate a vertical rod and a horizontal rod, respectively, which rods are connected with each other through any one of the connectors 3, 3' and 3" for the rods, i.e., reinforcing rods, according to the present invention, each of which connectors 3, 3' and 3" is integrally made of a spring quality wire material such as a spring quality steel wire and a spring quality synthetic resin.

In the first preferred embodiment 3 of the present invention shown in FIGS. 1 to 5, the numeral 4 designates an upper portion of the connector 3 of the present invention, which upper portion 4 is substantially laterally directed and has a U-shaped configuration, in which upper portion 4 is defined a longitudinal space portion 5 one side of which opens. The numeral 6 designates a lower portion which has a substantially U-shaped configuration, in which lower portion 6 is defined another longitudinal space portion 7 which has an opening directed to the same direction as that of the opening of the space portion 5. Front ends of both feet 8 and 9 of the upper portion 4 of the connector 3 are bent downward to form bends so that each of the feet 8 and 9 of the upper portion 4 forms a lateral space portion 10 having an opening in a direction opposite to a direction in which the space portion 5 has its opening. And, from a front end of one foot 8 of the feet 8 and 9 of the upper portion 4 of the connector 3 extends downward and obliquely a middle portion 11 of the connector 3, a lower end of which middle portion 11 is connected to a foot 12 of feet of a lower portion 6 of the connector 3, which foot 12 is disposed in a position corresponding to that opposite to a position in which the foot 8 of the upper portion 4 is disposed.

Now, an operation for connecting both the reinforcing rods 1 and 2 with each other through such connector 3 will be hereinbelow described with reference to FIGS. 4 and 5.

In a crossing portion of both the reinforcing rods 1 and 2, the vertical rod 1 is inserted into the space portion 5 of the connector 3 with the use of the opening of the space portion 5 so as to be placed in the space portion 5 defined between both the feet 8 and 9 of the upper portion 4 of the connector 3, in its upper area projecting upward over the horizontal rod 2, while the connector 3 is held by the worker in a lower area of the middle portion 11 thereof for facilitating such connecting operation of the connector 3.

Then, the middle portion 11 of the connector 3 is moved toward the vertical rod 1 into a position shown with a chain line in FIG. 5 so as to abut against the vertical rod 1 while held by the worker, so that the horizontal rod 2 is inserted into the space portion 10 defined by the bends of the front ends of both feet 8 and 9 of the upper portion 4 of the connector 3.

Then, when the use of a resiliency of the middle portion 11 of the connector 3, a lower area of the middle portion 11 thereof is moved toward the vertical rod 1 while temporarily deformed to make it possible that a lower end of the middle portion 11, i.e., the bend of the lower portion 6 of the connector 3 is placed behind the vertical rod 1. Thereafter, when the middle portion 11 of the connector 3 is made free from the worker's hold, the middle portion 11 is returned to its natural state by its resiliency so that the vertical rod 1 is inserted into the space portion 7 of the connector 3 to be connected thereto.

Figure 2:
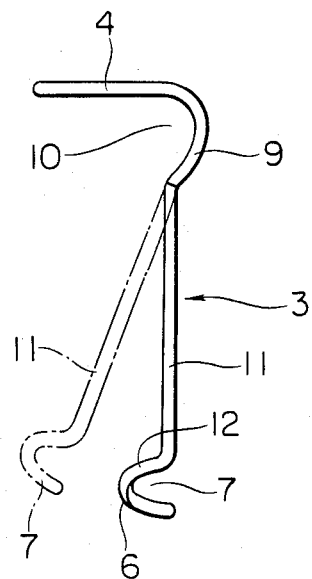
FIG. 2 is a left side view of the first embodiment of the present invention.
Figure 3:
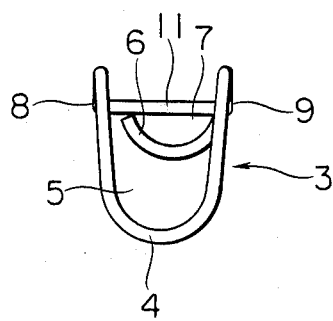
FIG. 3 is a plan view of the first embodiment of the present invention.

Thus, the vertical rod 1 and the horizontal rod 2 are firmly wound by the upper portion 4 and the lower portion 6 of the connector 3 under the effect of the resiliency of the connector 3 itself, respectively to be firmly connected with each other in the middle portion 11 of the connector 3, wherein the upper area and the lower area of the vertical rod 1 are placed in the space portion 5 and the space portion 7 of the connector 3 respectively, while the horizontal rod 2 is placed in the space portion 10 of the connector 3. In this connecting operation of the connector 3, the connector 3 an initial state of which is shown with a solid line in FIG. 2 is temporally deformed into another state shown with a chain line in the same drawing.

In disconnecting operation of the connector 3 having thus connected the vertical rod 1 and the horizontal rod 2, such disconnecting operation is conducted in reverse sequence of the above connecting operation of the connector 3, i.e., at first, the lower portion 6 of the connector 3 is disconnected from the lower area of the vertical rod 1, and then both the feet 9 and 10 of the upper portion 4 of the connector 3 are disconnected from the horizontal rod 2. After that, the upper portion 4 of the connector 3 is disconnected from the upper area of the vertical rod 1. In this disconnecting operation of the connector 3, the worker is not required to be skilled therein as is in the connecting operation of the same.

Figure 7:
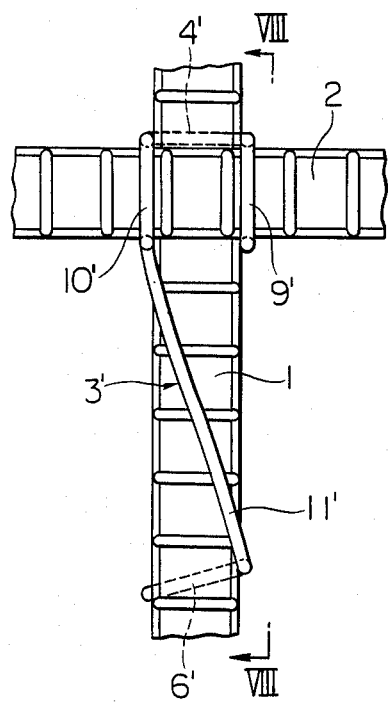
FIG. 7 is a front view of the second embodiment of the present invention in a condition in which the vertical rod and the horizontal rod are connected with each other through the second embodiment of the present invention.
Figure 8:
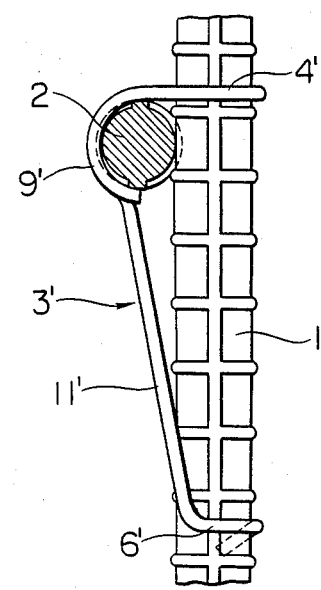
FIG. 8 is a sectional view taken along the line VIII—VIII shown by the arrow in FIG. 7.

As shown in FIGS. 6 to 8, especially, as is clear from FIG. 7, the second embodiment 3' of the connector of the present invention is different from the first embodiment 3 of the connector of the present invention in that, first, as is clear from the front view of the connector 3' shown in FIG. 7, both feet 9' and 10' of an upper portion 4' of the third embodiment 3' are reversely arranged with respect to the arrangement of both the feet 9 and 10 of the first embodiment 3 so that a middle portion 11' of the second embodiment 3' declines towards a direction opposite to that of the middle portion 11 of the first embodiment 3, whereby a connecting portion between the middle portion 11' and a lower portion 6' of the second embodiment 3' is disposed in a position opposite to a position in which the middle portion 11 and the lower portion 6 of the first embodiment 3 are connected with each other. However, since there is no difference in connecting/disconnecting operation between the first embodiment 3 and the second embodiment 3', such operation of the second embodiment 3' is not described again for avoiding an overlapping of description.

Figure 9:
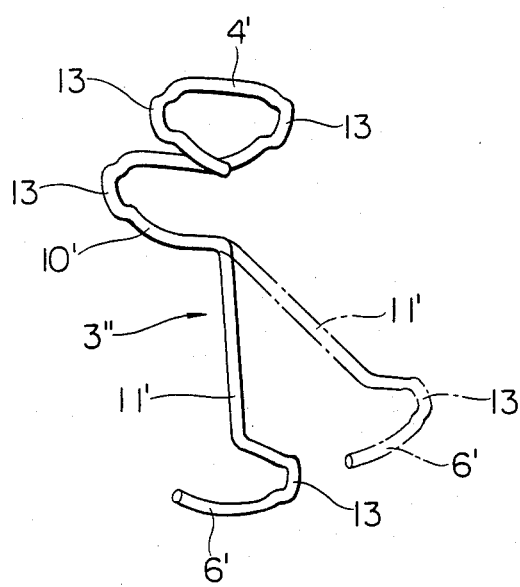
FIG. 9 is a perspective view of the third embodiment of the connector for the reinforcing rods, according to the present invention.
Figure 10:
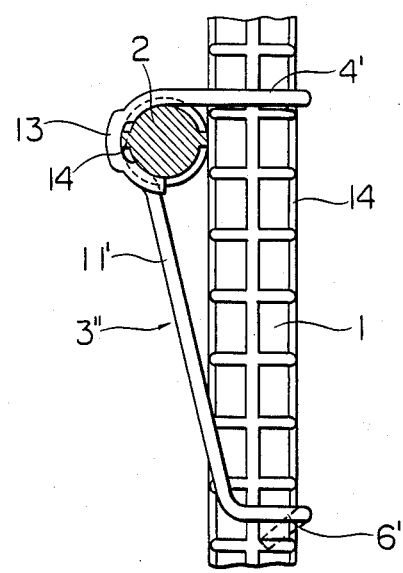
FIG. 10 is a sectional view similar to FIG. 5, showing a condition in which the vertical rod and the horizontal rod are connected with each other through the third embodiment of the present invention.

FIGS. 9 and 10 show the third embodiment 3" of the connector of the present invention, which embodiment 3" is utterly identical with the second embodiment 3' except that the third embodiment 3" is provided with projections 13 in its bends, which projections 13 are adapted for receiving the reinforcing rib portion 14 of each of the reinforcing rods 1 and 2. Since there is no difference in connecting/disconnecting operation between the second embodiment 3' and the third embodiment 3", such operation of the third embodiment 3" is not described again for avoiding an overlapping of description.

Each of the space portions 5, 7 and 10 of the connector 3 (3', 3") is designed to be adapted in size for diameters of the reinforcing rods 1 and 2. Consequently, in the same design thereof, the connector 3 is made of the same diameter material so that its connecting force is fixed, whereby it is possible to obtain a stable connection through the connector of the present invention.

Although particularly preferred embodiments of the connector of the present invention have been described in detail for illustrative purposes, it will be recognized that variations or modifications of the above described embodiments of the present invention, including the rearrangement of parts thereof, lie within the scope of the present invention.

What is claimed is:

1. A wire connector for mutually perpendicular reinforcing rods, comprising: an elongated resilient wire member having a laterally extending upper portion which is substantially U-shaped in plan view and defines a first space that is open along the front lateral side thereof whereby a first reinforcing rod can extend upwardly through said first space so that its rear side bears against the bight of said U-shaped upper portion, a pair of substantially parallel feet portions extending downwardly from the free ends of the legs of said U-shaped upper portion, said feet portions being curved in a rearward direction as they extend downwardly to define a second space that opens rearwardly whereby a second reinforcing rod positioned in front of and extending at a right angle to said first reinforcing rod can be engaged by said feet portions and pressed against the front side of said first reinforcing rod, said wire member having a middle portion that extends downwardly from the lower end of one of said feet portions on one side of said first space and also extends obliquely toward the opposite side of said first space as it extends downwardly whereby said middle portion is adapted to extend in front of and across said second reinforcing rod below said feet portions of said wire member, said wire member having a lower portion extending laterally from the lower end of said middle portion, said lower portion being substantially U-shaped in plan view and defining a third space that is longitudinally aligned with said first space and also is open along the front lateral side thereof, said middle portion of said wire member being resiliently deformable whereby said lower portion can be moved to contact the rear side of said first reinforcing rod so that said first reinforcing rod extends upwardly through said third space and said lower portion urges said first reinforcing rod so that it extends perpendicularly to said second reinforcing rod.

2. The connector as set forth in claim 1, wherein:
   a projecting portion is formed in the bight portion of each of said upper and lower portions of said connector, which projecting portions are adapted to engage reinforcing ribs on said first and second rods.

3. The connector as set forth in claim 1 in which said lower portion extends substantially at a right angle to said middle portion.

* * * * *